United States Patent
Beckers et al.

(10) Patent No.: US 8,654,604 B2
(45) Date of Patent: Feb. 18, 2014

(54) CIRCUIT CONFIGURATION FOR EVALUATING AND/OR ACTIVATING SOUND TRANSDUCERS

(75) Inventors: Roland Beckers, Lauffen (DE); Karl-Heinz Richter, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 631 days.

(21) Appl. No.: 12/303,967

(22) PCT Filed: Oct. 2, 2007

(86) PCT No.: PCT/EP2007/060453
§ 371 (c)(1), (2), (4) Date: May 10, 2011

(87) PCT Pub. No.: WO2008/064944
PCT Pub. Date: Jun. 5, 2008

(65) Prior Publication Data
US 2011/0205838 A1    Aug. 25, 2011

(30) Foreign Application Priority Data
Nov. 28, 2006    (DE) .......................... 10 2006 056 095

(51) Int. Cl.
*H04B 17/00*    (2006.01)
*B06B 1/00*    (2006.01)

(52) U.S. Cl.
USPC ............................................. 367/13; 367/901

(58) Field of Classification Search
USPC .................... 367/13, 137, 903, 901
See application file for complete search history.

(56) References Cited

U.S. PATENT DOCUMENTS

2011/0205838 A1* 8/2011 Beckers et al. ................. 367/13

FOREIGN PATENT DOCUMENTS

| DE | 102 48 677 | | 4/2004 |
| DE | 102006056095 A1 | * | 5/2008 |
| WO | WO 2008064944 | * | 6/2008 |

OTHER PUBLICATIONS

International Search Report, PCT/EP2007/060453 dated Dec. 18, 2007.

* cited by examiner

*Primary Examiner* — Daniel Pihulic
(74) *Attorney, Agent, or Firm* — Kenyon & Kenyon LLP

(57) ABSTRACT

A circuit configuration for evaluating and/or for activating sound transducers for application in vehicles, particularly as a part of a parking assistance, the circuit configuration including a transformer having a primary winding and a secondary winding, and the windings lead to a transformation ratio of greater than 1, terminals being provided for a sound transducer at the secondary winding and terminals being provided at the primary winding for activating device(s) which generate a voltage that changes with time at the primary winding of the transformer; on the side of primary winding (primary side) an antenna being provided which is suitable for receiving electrical fields generated by interference signals, and which is connected to the side of secondary winding (secondary side) via a coupling path; a device for phase shifting being provided in the coupling path, which brings about a phase shift by 180° in the electrical interference signals received by the antenna.

11 Claims, 2 Drawing Sheets

CIRCUIT CONFIGURATION FOR EVALUATING AND/OR ACTIVATING SOUND TRANSDUCERS

FIELD OF THE INVENTION

The present invention relates to a circuit configuration for evaluating and/or activating sound transducers for application in vehicles, particularly as part of a parking assistance. The present invention also relates to an ultrasound sensor having such a circuit configuration.

BACKGROUND INFORMATION

In motor vehicles, ultrasound sensors are used as part of parking assistances, for measuring parking gaps or for illuminating blind spots. These sensors emit sound pulses and pick up signals reflected by obstacles, amplify them, convert them to evaluable signals and supply them to a control unit. In addition, the sensors have a sound transducer and corresponding transmit and receive electronics. A pot-shaped sound transducer has proven itself as a particularly robust construction, whose pot floor is formed by a resonant diaphragm that is excited by a piezo element. In order to make possible operating ranges of the sensor of approximately 3 m, the piezo element is activated using a comparatively high voltage between 50 Volt and 100 Volt, which is normally generated by a transformer or a transmitter, as the case may be, having a transformation ratio greater than 1. On the side of the primary winding, the primary side, a d.c. voltage is switched on and off periodically, in this context, whereby on the secondary side, the side of the secondary winding, a higher voltage may be picked off, corresponding to the transformation ratio. This is used as the activating voltage for the sound transducer.

The echo signals reflected by the obstacles typically have amplitudes between 0.1 mV and 1.0 mV. There are, however, interference sources in the surroundings of the vehicle and in the vehicle itself, which produce interference signals that are also in the working frequency of the sensors and that have comparable amplitudes. Interference comes especially frequently from control units of fluorescent strip lamps and control units of gas discharge lamps in automobile headlights. Since the input of the amplifier is the most sensitive place of the evaluation electronics, these interferences are coupled in via the amplification path.

The following measures are conventional for suppressing interference: First, low pass, high pass and band pass filters are provided in the circuit topology and the dimensioning of the circuit. In addition, it is known that one may develop the layout of the circuit suitable for the EMC (electromagnetic compatibility) and in multilayer. One may also work using screening of the housing and of parts of the circuit.

DE 102 48 677 describes a method for the compensation of magnetic interference fields. Since the transmitter itself functions as the antenna for receiving the magnetic interferences, DE 102 48 677 proposes using a second transformer having the identical properties.

SUMMARY

Example embodiments of the present invention provide a circuit configuration which makes possible as effective a suppression as possible of the interferences generated by the electrical fields, using a low constructive effort and having low costs.

As is conventional, the circuit configuration according to example embodiments of the present invention also have a transmitter in the form of a transformer having a primary winding and a secondary winding, the windings leading to a transformation ratio of greater than 1. On the secondary winding, terminals for the sound transducer are provided and at the primary winding, terminals for an activating device are provided, the activating device, which may be developed from transistors or an ASIC, generating a voltage that changes with time at the primary winding of the transformer.

Now, example embodiments of the present invention to provide an "antenna", for receiving electrical signals on the primary side, that is also sensitive to the parasitic interference signals. The signals received by this antenna are phase-shifted by a phase shifter by 180° and are supplied to the secondary side, via a coupling path, as a compensation signal. In this context, the circuit should be laid out in such a way that the compensation signal, when it is supplied to the secondary side, has the same amplitude, to the greatest extent possible, and a phase position shifted by 180°, as has the interference signal picked up by the component parts of the secondary side. The signals of the same amplitude that are phase-shifted with respect to one another, namely, the interference signal received on the secondary side and the compensation signal "generated" on the primary side are mutually compensating. Consequently, one point of view of example embodiments of the present invention is to be found in the compensation method for suppressing the interference voltage, which may be advantageously implemented using the component parts present in the sensors. One substantial advantage is that the suppression of E-field interferences is possible without screening, and that the suppression of E-field interferences is improved in combination with screening.

Now, it is possible, on the one hand, to lay out the geometry of the antenna in such a way that the amplitudes of the received signals corresponds approximately to the amplitude of the electrical parasitic interference signals on the secondary side. In this case, an amplification of the signals received by the antenna is not required. In this context, "antenna" designates any primary side arrangement of conductors that has a certain sensitivity to electrical fields.

It is, however, particularly advantageous if the formerly present transformer or transmitter is used as a phase shifter. In this case, the antenna is connected between the one activating device and the terminal provided at the primary winding. Thus, the coupling path runs directly over the transformer. The latter is of dual importance. Thus, on the one hand, the electrical signal experiences a phase shift of 180° on the way through the transformer, and on the other hand, it is amplified corresponding to the transformation ratio. As a result of the voltage transformation, the "antenna", that is, the effective antenna area, is able to be dimensioned smaller than the "parasitic antenna" at the amplifier input.

It is conventional that one may use transformers or transmitters having two primary windings and one secondary winding. The construction of the windings is so that one of the primary windings does not cause any phase shift, whereas in the other, a phase shift of 180° occurs in relation to the secondary winding. The transmitter transforms the transmission voltage to a higher value, and reduces the post-oscillation by having the piezo capacitance compensated for by the secondary inductance. In the process, the oscillating circuit is tuned to the sound transducer frequency.

In the case of such transformers or transmitters, the interference signal is also compensated for by a second compensation signal which, ideally, has the same absolute value and is rotated by 180° in phase. This creates an artificial second coupling path from the primary side of the transmitter to the secondary side, and thus to the amplifier input. This connection of the primary side receives the antenna. In order for a compensation of the amplitude to take place, the ratios should be designed so that the interference voltage at the antenna corresponds to the interference voltage, at the amplifier input, divided by the transmission ratio of the transmitter. In addition, the above-mentioned phase condition is to be satisfied. In the simplest case, the connection of the second winding of the primary side is not developed as the "antenna".

It is particularly advantageous if the antenna is developed as a planar conductor having a specific antenna area. In response to such a geometry, especially in response to a rectangular or circular antenna area, the properties of the antenna are well able to be predetermined. In addition, accommodating the antenna in the circuit is comparatively simple. In order to obtain as good as possible a compensation, it is advantageous to provide the antenna area of this antenna in such a way that it is adjusted to the virtual area, formed by the conductors of the secondary side, divided by the transmission ratio ü, and is similar to it particularly at least approximately. Consequently, one antenna acts on both sides of the transformer, respectively, the primary side in particular having a lower sensitivity by a factor of ü. The actual size of the antenna area, in this instance, can only be calculated in limited fashion. In practice, it will take some experiments to find a suitable antenna and its arrangement for the special circuit configuration.

Under certain circumstances, it may be advantageous to provide a second antenna of a certain antenna area, on the primary side, between second activating device and the terminal provided for this at the primary winding, the antenna area of the second antenna being different from the antenna area of the first antenna. Using such an arrangement of two antennas at each of the windings of the primary side, the effect of the antennas is oppositely directed, since their receive voltages differ in their phase position by 180°. The desired compensation is achieved by different sizes in the antennas. The advantage of this example embodiment is to be seen in the better adjustment of the compensation.

It may also be of advantage to provide such an antenna on the secondary side too, whose antenna area of the above-named virtual area is added to that of the conductors on the secondary side. Such a secondary side antenna has the effect of a better control over the interference signals. In this constellation, the calculation in advance of the electrical properties to be expected becomes simpler.

It may also be advantageous, in addition to the compensation of electrical interference fields according to example embodiments of the present invention, to compensate for the magnetic interference fields, for instance, using the method proposed in DE 102 48 677.

Example embodiments are shown in the drawings, and are described below in greater detail by giving further particulars.

DETAILED DESCRIPTION

Figure 1:
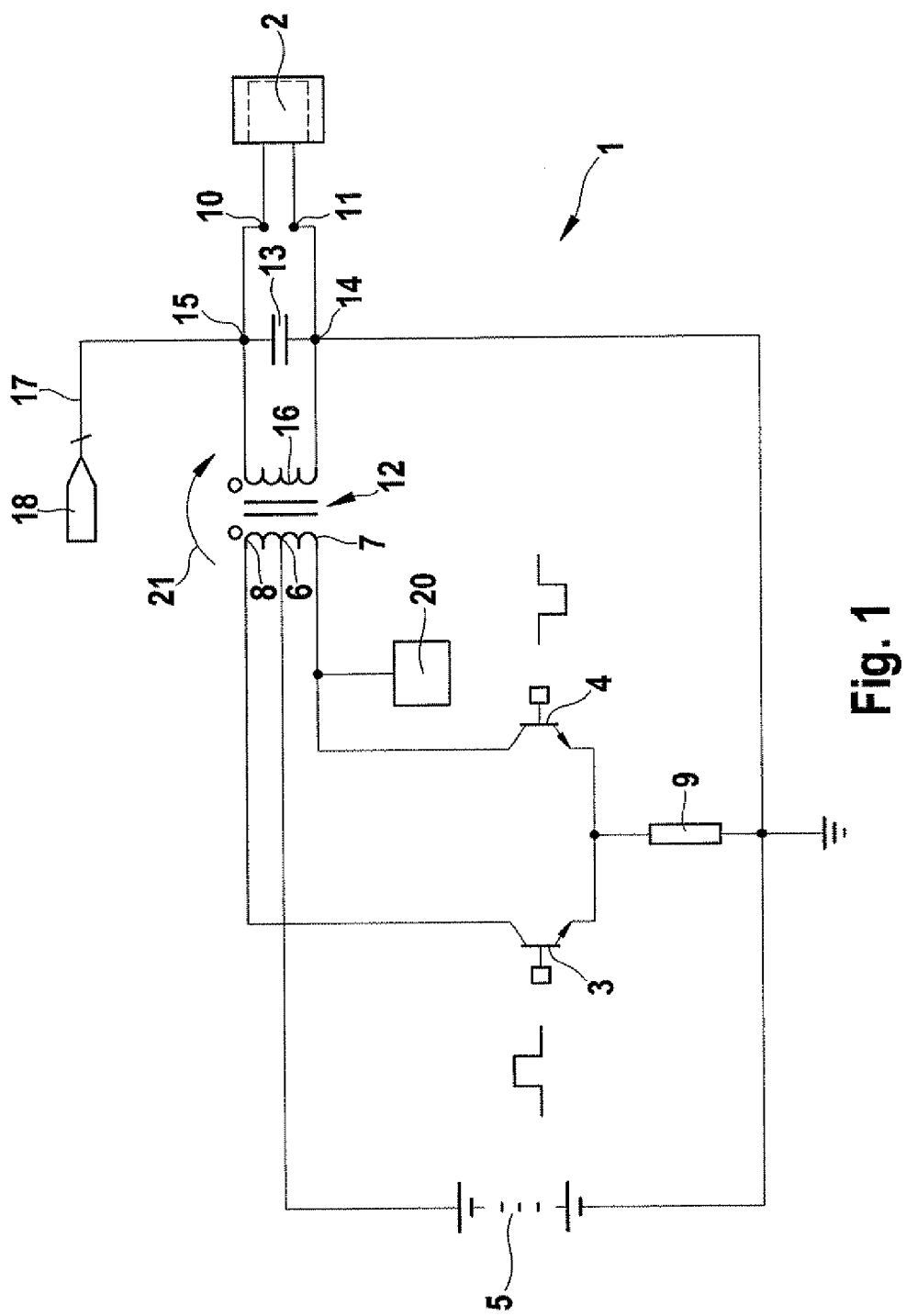
FIG. 1 a circuit configuration according to example embodiments of the present invention having transistors and FIG. 2 a circuit configuration having an ASIC.

FIG. 1 shows the principle of such a control circuit 1 for a sound transducer 2. A voltage source 5, which is connected at center terminal 6 of two normally equal windings 7, 8, is alternately connected to the respective winding 7, 8 via transistors 3, 4. Windings 7, 8 are respectively connected in each case via transistors 3, 4 and a common resistor 9 to a reference potential. Consequently, on the primary side a voltage changing with time is connected, which is transformed using a specified transformation ratio ü to the secondary side. The transformation ratio is given by $ü^2 = L_{sek}/L_p$. Here, $L_{sek}$ is the inductance of the secondary side and $L_p$ of winding 7 or 8, respectively. The achievable voltage on the secondary side at terminals 10 and 11 for sound transducer 2 is a function of the magnitude of the primary side current, the primary side voltage range, the transformation ratio and the load impedance on the secondary side of transformer 12. The transformer has two primary windings 7, 8 and one secondary winding 16 having the direction of winding denoted by the points.

On the secondary side, between outputs 14 and 15, a capacitor 13 is provided. Output 14 of secondary winding 16, in common with resistor 9, is also connected to the reference potential of voltage source 5, and has a connection to terminal 11. The other output 15 of the secondary winding is normally in electrical contact, besides with terminal 10, also via a connection 17 to an evaluation circuit 18. The magnitude of the "receive signal" transmitted via connection 17 is typically in a range between 0.1 mV and 10 mV. The processing of such comparatively small signals requires a circuit layout and selection of components in such a way that as great as possible an insensitivity to interferences from the surroundings is ensured.

For the compensation of interferences by electrical fields, an antenna 20 is connected on the primary side to the electrical connection of transistor 4, used as the first activating device, to primary winding 7 of transformer 12. The antenna is developed as a planar conductor and is suitable for receiving electrical fields generated by interference signals. In this particular arrangement, an antenna area between about 5 mm$^2$ and 15 mm$^2$ may be provided. The path for coupling in the signals picked up by antenna 20, coupling path 21, runs through transformer 12. In the process, transformer 12 acts as a phase shifter which brings about a phase shift by 180° of the interference signals received by antenna 20. The area of antenna 20 is equal at least approximately to the virtual area, formed by the conductors of the secondary side, divided by transmission ratio ü of transformer 12.

Figure 2:
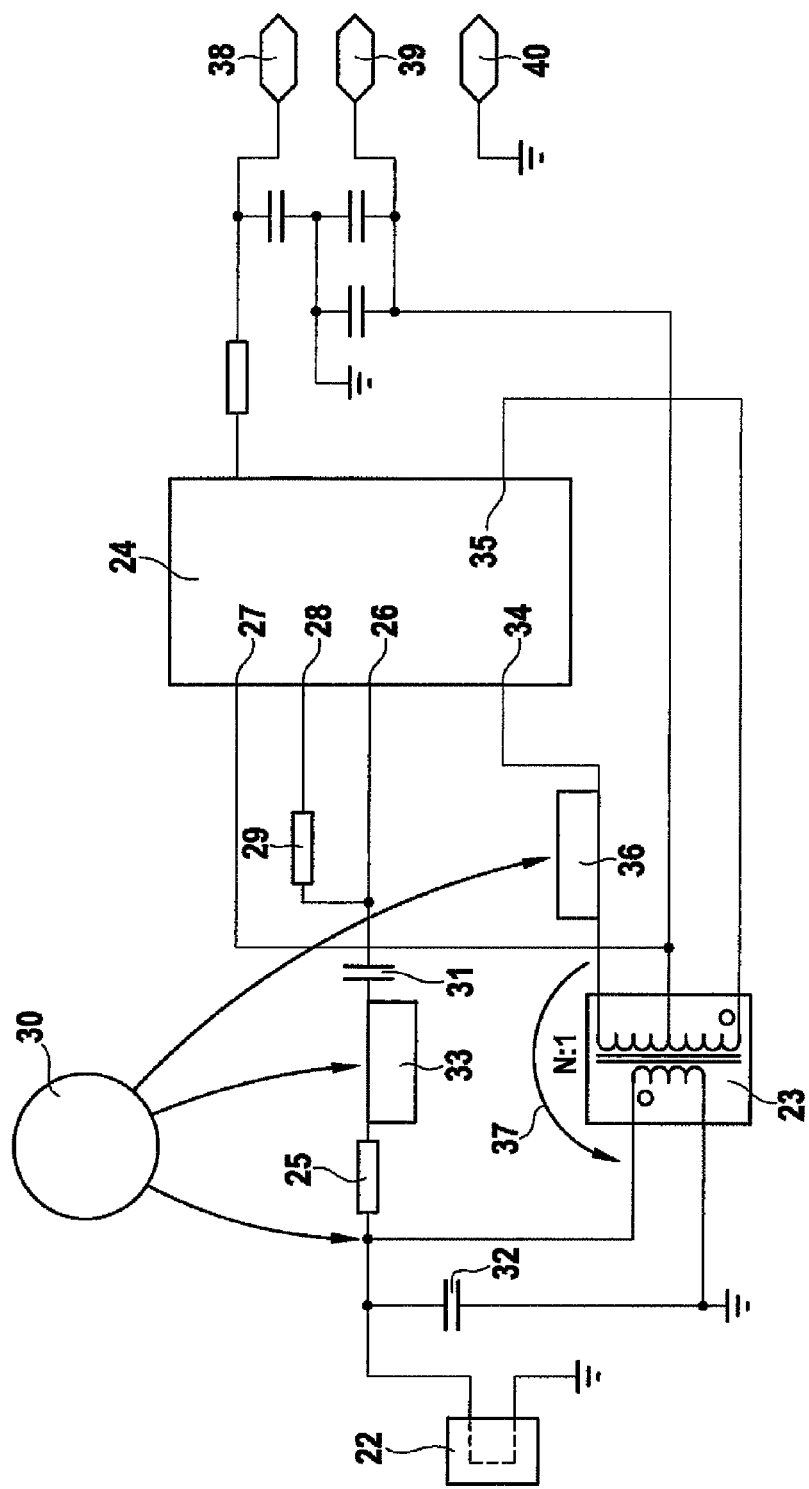

FIG. 2 shows a circuit for a sound transducers 22, the activation of transformer 23, which in this example, too, again has two primary windings and one secondary winding, and the evaluation of the signals coming from the sound transducer takes place via an integrated circuit 24 (ASIC).

When the sensor diaphragm is excited by the echo signal or other sound signals, a voltage is created at the terminals of sound transducer 22. The echo voltage is supplied via a resistor 25 to the amplifier implemented by ASIC 24 via amplifier input 26. Amplifier output 28 is applied to the signal line via resistor 29. The supply voltage for transformer 23 is picked off at port 27 on ASIC 24.

The coupling in of the signals of interference source 30 (coupling path) takes place mainly via the connecting line of the sound transducer to the printed circuit board and via the printed conductors and components at amplifier input 26, for instance, resistor 25, capacitors 31 and 32 and the secondary side of transformers 23. All interference signals come together at summation point 33. At the working frequency of the sensor, all the named components and connections may be regarded as electrically "short", that is, the phase shift between all possible coupling points is negligible.

The primary side of the transformer is connected to transmitting stages 34 and 35 of ASIC 24, which emit a push-pull signal when transmitting. In the remaining time, the outputs of the transmitting stages are highly resistive.

In this example, too, an antenna 36 is provided on the primary side which also receives the interference signals. The compensation according to example embodiments of the present invention takes place via compensation path 37 that goes through transformer 23.

The communication with a control unit, not shown, takes place via point 38, the supply voltage being connected between 39 and 40.

What is claimed is:

1. A circuit configuration for at least one of (a) evaluating and (b) activating sound transducers for application in vehicles, comprising:
   a transformer having a primary winding and a secondary winding, the windings leading to a transformation ratio of greater than 1, terminals being provided for a sound transducer at the secondary winding and terminals being provided at the primary winding for activating a device that generates a voltage that changes with time at the primary winding of the transformer,
   wherein, on a side of primary winding, an antenna is provided which is adapted to receive electrical fields generated by interference signals, and which is connected to a side of secondary winding via a coupling path, a device for phase shifting being provided in the coupling path, which brings about a phase shift by 180° in the electrical interference signals received by the antenna.

2. The circuit configuration according to claim 1, wherein the circuit configuration is arranged as a part of a parking assistance system.

3. The circuit configuration according to claim 1, wherein a geometry of the antenna is arranged such that an amplitude of the received signals corresponds approximately to an amplitude of parasitic electrical interference signals on the secondary side.

4. The circuit configuration according to claim 1, wherein one side of the transformer is arranged as a phase shifting device, the coupling path leading through the transformer and the antenna being connected between a first activating device and the terminal provided for it at the primary winding.

5. The circuit configuration according to claim 1, wherein the antenna is arranged as a planar conductor having a certain antenna area.

6. The circuit configuration according to claim 5, wherein the antenna area is adjusted to a virtual area formed by the conductors of the secondary side divided by the transformation ratio.

7. The circuit configuration according to claim 5, wherein the antenna area is one of (a) rectangular and (b) circular.

8. The circuit configuration according to claim 1, wherein, on the primary side, a second antenna of a certain antenna area is connected between a second activating device and the terminal provided for it at the primary winding, an antenna area of the second antenna being different from an antenna area of the first antenna.

9. The circuit configuration according to claim 1, wherein the antenna area has a magnitude of at least one of (a) between 2 $mm^2$ and 20 $mm^2$ and (b) between 5 $mm^2$ and 15 $mm^2$.

10. The circuit configuration according to claim 1, wherein an additional antenna is situated on the secondary side, whose area is added to a virtual area.

11. An ultrasound sensor arranged as a part of a parking assistance in a vehicle, comprising:
   a sound transducer; and
   a circuit configuration adapted to at least one of (a) evaluate and (b) activate the sound transducer, the circuit configuration including a transformer having a primary winding and a secondary winding, the windings leading to a transformation ratio of greater than 1, terminals being provided for a sound transducer at the secondary winding and terminals being provided at the primary winding for activating a device that generates a voltage that changes with time at the primary winding of the transformer;
   wherein, on a side of primary winding, an antenna is provided which is adapted to receive electrical fields generated by interference signals, and which is connected to a side of secondary winding via a coupling path, a device for phase shifting being provided in the coupling path, which brings about a phase shift by 180° in the electrical interference signals received by the antenna.

* * * * *

UNITED STATES PATENT AND TRADEMARK OFFICE
CERTIFICATE OF CORRECTION

PATENT NO.       : 8,654,604 B2                     Page 1 of 1
APPLICATION NO. : 12/303967
DATED            : February 18, 2014
INVENTOR(S)      : Beckers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1302 days.

Signed and Sealed this

Twenty-ninth Day of September, 2015

Michelle K. Lee
*Director of the United States Patent and Trademark Office*